Patented Feb. 1, 1949

2,460,582

UNITED STATES PATENT OFFICE 2,460,582

DRYING POLYMERIC MATERIALS

Archie B. Japs, Cuyahoga Falls, Ohio, assignor to The B. F. Goodrich Company, New York, N. Y., a corporation of New York No Drawing. Application June 4, 1946, Serial No. 674,383

3 Claims. (Cl. 260—29.6)

This invention relates to a method for drying finely-divided particles of water-insoluble synthetic polymeric materials, and pertains more specifically to a method for removing water from the surface of water-wet polymer particles which have been prepared by polymerization in aqueous dispersion.

Aqueous dispersions or suspensions of finely-divided synthetic polymeric materials have long been known and have been widely used. These dispersions may be prepared by grinding the dry polymer to the desired particle size and dispersing or suspending the particles in an aqueous medium with the help of suitable wetting or dispersing agents, but in recent years they have generally resulted from polymerization of the monomeric material in aqueous dispersion, a type of polymerization commonly used because of the ease with which it is carried out. By such a polymerization in aqueous dispersion there may be prepared not only highly stable latex-like dispersions of polymer particles, but also, in the so-called "pearl" type of polymerization, a granular polymeric product which does not remain stably dispersed in the aqueous medium but which settles out upon standing. When the polymer is thermoplastic, such as a polymer made by polymerizing a polymerizable compound containing a single olefinic double bond, utilization of the polymer and fabrication of manufactured articles therefrom invariably involves either heating the polymer to fuse it or dissolving it in a non-aqueous medium or both.

In any of these processes, in order to obtain a product having the desired properties, it is usually desirable to remove substantially all of the water from the polymer. For example, in the manufacture of transparent articles, failure to remove all of the water from the polymer composition is objectionable because it results in haziness; in the manufacture of electrical insulation, it results in a lowered electrical resistivity. Molded or extruded goods made from imperfectly dried polymer are apt to be non-homogeneous and to have low tensile strength. Moreover, when the polymer is plasticized, failure to remove all of the water results in lack of homogeneity and consequently unsatisfactory properties.

In the past, polymers of this type have usually been dried by simple heating, either at atmospheric or reduced pressure. Because of the surface effects involved in polymer particles of the sizes usually encountered (less than 150 microns), it has proven very difficult to remove the water completely by this method. Moreover, when granular or "pearl-type" polymers are dried in a conventional circulating hot air oven, the fines present frequently dust badly, and static electrical charges are generated during the drying operation, both of which conditions present industrial hazards. On the other hand, when the stable, latex-like aqueous dispersions of polymer are coagulated, filtered, and heated to drive out the water, it is difficult to eliminate all of the water from the composition before the polymer particles fuse together or decompose; as a result, the residual water is trapped within the polymer aggregates and cannot then be removed even by heating to extremely high temperatures.

I have now discovered a method for removing water from the surface of such water-wet particles of thermoplastic, water-insoluble polymers deposited from aqueous dispersion, the polymers being made by polymerizing a monomeric compound containing a single olefinic double bond. My new method not only eliminates the difficulties discussed above, but also makes possible the production of substantially water-free plasticized polymer compositions without the necessity for isolating the dry, finely-divided polymer particles as such, an advantage of great practical importance because of the large proportion of such polymer which is used only in the plasticized condition.

My method involves mixing with the water-wet polymer particles deposited from aqueous dispersion a water-immiscible liquid in which the polymer particles are substantially insoluble at ordinary temperatures, i. e. at temperatures below about 30° C., and then inverting the phases to produce a dispersion of the polymer particles in the water-immiscible liquid. By this operation the layer of water on the surface of the individual polymer particles is replaced with a layer of the water-immiscible liquid; the water forms a separate liquid layer which may readily be separated from the dispersion of polymer particles in water-immiscible liquid. Any small amount of water which does not immediately enter the separate aqueous layer is readily eliminated from the dispersion by gentle heating or mechanical working, which can be carried out either at atmospheric or reduced pressure.

I am aware that it has been proposed to add plasticizers to latex-like aqueous dispersions of vinyl polymers at ordinary temperatures. However, such processes do not give the same results as mine, because the hydrophilic protective layer on the surface of the polymer particles prevents access of the water-immiscible liquid thereto.

There is obtained only a mixed dispersion of separate polymer particles and droplets of the immiscible liquid in the water. It is just as difficult to remove the water from the surface of these polymer particles, by conventional methods, as it is if no plasticizer or water-immiscible liquid is added.

I am also aware that it has been proposed to mix plasticizers or solvents with aqueous suspensions of polymer particles at elevated temperatures. However, in this case the plasticizer dissolves in the polymer particles, resulting in particles of plasticized polymer which are wet with water, that is which have a layer of water on their surface, and are suspended in the original aqueous medium. Here again, the surface effects of the small particles make removal of the water and drying of the polymer particles extremely difficult.

The polymers to which my process may advantageously be applied are those which are made by polymerizing monomeric materials comprising polymerizable compounds containing a single olefinic double bond, more particularly those monomeric materials comprising predominantly (i. e. containing over 50% by weight of) polymerizable compounds containing a single $CH_2=C<$ group. Although the process may be applied to water-wet particles of such polymers regardless of whether the polymerization itself is carried out in aqueous dispersion or in solution or in the absence of any solvent or diluent, obviously its principal and most valuable application is to the polymers made in aqueous dispersion, which are necessarily obtained in the form of water-wet particles because of the method employed to make them. More specifically, the polymers to which the process may be applied include, among others, those made by polymerizing ethylene, isobutylene, styrene, vinyl naphthalene, vinyl acetate, vinyl propionate, vinyl butyrate, vinyl benzoate, vinyl fluoride, vinyl chloride, vinyl bromide, vinylidene fluoride, vinylidene chloride, vinylidene chlorofluoride, methyl acrylate, methyl methacrylate, methyl ethacrylate, ethyl acrylate, ethyl alpha-chloroacrylate, acrylonitrile, methacrylonitrile, as well as mixtures of one or more of these materials with each other or with other compounds polymerizable therewith containing a single olefinic double bond, such as dimethyl maleate, diethyl maleate, dimethyl fumarate, diethyl chloromaleate, diethyl crotonate, dibutyl crotonate and the like. Particularly well adapted to this process are polymers made by polymerizing monomeric materials comprising predominantly (i. e. containing over 50% by weight of) a chloroethylene having from one to two chlorine atoms on one only of the carbon atoms, such as high molecular weight polyvinyl chloride.

Although the process may be applied to polymer-water mixtures containing up to 80% of water by weight, best results are obtained by using it with mixtures containing less than 70% of water by weight, preferably less than 50%. If the polymer particles are prepared by "pearl-type" polymerization in aqueous dispersion, in which case the particles are deposited from the dispersion immediately because of the lack of sufficient emulsifying or dispersing agent to maintain the stability of the disperse polymer phase, it is necessary only to remove enough water to bring the water content of the polymer-water mixture down to 80% or less, as pointed out above. The removal of the excess water may be accomplished by decantation or filtration, preferably the latter. On the other hand, if the polymer particles are in the form of a stable, latex-like dispersion from which they are not readily deposited, it is necessary first to coagulate the dispersion. This step may be accomplished by any of the well-known methods. In some cases, heating or mechanical agitation may be sufficient to bring about coagulation. A water-soluble alcohol may also be used to coagulate many dispersions. Usually, however, it is desirable to employ an ionic coagulating agent, such as a water-soluble salt of a polyvalent metal. If an anionic-active dispersing agent is present in the aqueous dispersion, coagulation may be accomplished by adding a cationic-active dispersing agent, and vice versa. After coagulation, the water content of the mixture may be reduced to 80% or lower by filtration, etc.

The size of the polymer particles to which the process is applied is not critical. For best results, however, the polymer particles should be less than about 200 microns in diameter, preferably less than about 50 microns, the advantages of the process being most readily apparent with particles of this size. The process may be applied to polymer particles as small as 0.05 micron in diameter, but particles of this size are difficult to work with, and it is preferred to employ particles having an average diameter of at least one micron. When using as the water-immiscible liquid a plasticizer which dissolves the polymer at elevated temperatures to form a plasticized polymer composition, it is preferred to employ polymer particles having an average diameter of about one to five microns.

The liquid to be added to the water-wet polymer particles may be any water-immiscible liquid, preferably an organic liquid, in which the particular polymer particles being treated are substantially insoluble at ordinary temperatures, i. e. at temperatures below about 30° C. It will be apparent that the liquid may be one in which the polymer particles are substantially insoluble even at higher temperatures as well as at temperatures below about 30° C. In fact, liquids may be used which do not dissolve the polymer appreciably under any conditions. Either volatile liquids or liquids which are substantially non-volatile may be employed. However, it will be appreciated that great advantages are obtained if the liquid is one which will dissolve the polymer at elevated temperatures. In this class are the liquids commonly employed as plasticizers for the polymers. Plasticizers preferably are sufficiently non-volatile so as to remain permanently in the plasticized polymer composition, and they generally dissolve the polymer effectively only at high temperatures, that is, at temperatures above about 75° C., frequently aided by the application of pressure or mechanical working, as in a hot roll mill. The particular liquid or plasticizer chosen will depend, of course, upon the properties of the particular polymer to which the process is applied; all of these polymers and their properties are well known in the art, and the particular plasticizers desirable to employ with each will be apparent to skilled workers. Among the common plasticizers which are generally used for a wide variety of such polymeric materials are various aromatic or aliphatic hydrocarbons, chlorinated or nitrated aromatic hydrocarbons, aromatic or long-chain aliphatic esters, ethers, ketones, or esters of inorganic acids, or mixed aromatic-aliphatic compounds of these types; for example, tricresyl phosphate, dibutyl phthalate, di-2-ethylhexyl phthalate, undecyl tetra-hydronaphthyl ketone, butyl phthalyl butyl glycollate, dibutyl sebacate, butyl o-benzoyl benzoate, diethylene glycol dibenzyl ether, dichlorbenzyl ether, and the like.

The proportion of water-immiscible liquid or plasticizers employed is not critical and may vary over a wide range. Best results are usually obtained by employing from about 0.2 to 4 parts by weight of the liquid for each part of polymer, preferably from about 0.4 to 1.5 parts for each part of polymer.

Mixing of the water-immiscible liquid with the water-wet polymer particles is preferably carried out at ordinary temperatures, below about 30° C.; if higher temperatures are employed it is essential that the polymer be substantially insoluble in the water-immiscible liquid at that temperature. Usually there is no advantage in employing higher temperatures.

In my process, upon mixing of the plasticizer with the water-wet polymer particles which have been deposited from aqueous dispersion, the phases are caused to invert with the result that the water at the surface of the polymer particles is replaced by the water-immiscible liquid. By this operation the water-immiscible liquid becomes the continuous phase, with the polymer particles dispersed in it, and the water becomes the disperse phase, which, because of lack of stability, coagulates immediately and forms a separable layer upon slight agitation or mechanical working of the mixture. This separable water layer may readily be removed by decantation.

All of the water originally present on the surface of the polymer particles is removed by this operation, and practically all of the water is separated from the water-immiscible liquid. Any small amount of water which does not immediately separate from the water-immiscible liquid layer is readily removed by gentle heating or slight mechanical working or both.

Inversion of the phases during or after mixing the water-immiscible liquid with the water-wet polymer particles may be accomplished by any of the well-known methods. An hydraulic shearing action, such as may be obtained in a colloid mill, may be sufficient. Ordinary mechanical agitation, particularly when an interfacial tension depressant or transfer agent is added, may be used. Among such materials are cationic-active soaps, lecithin, trisodium phosphate, organic amines or amine soaps, polyvalent metal soaps, and the like. When the water-wet polymer particles are deposited from aqueous dispersion by the action of an ionic or other coagulating agent, such an interfacial tension depressant may be formed by the action of the coagulating agent upon the dispersing agent. For example, if a vinyl polymer latex containing sodium stearate as a dispersing agent is coagulated by the addition of calcium chloride, the insoluble calcium stearate will be formed which will act as an interfacial tension depressant.

The following specific examples will serve more fully to illustrate the nature of my invention, but are not intended as a limitation.

*Example I*

An aqueous dispersion of high molecular weight polyvinyl chloride was prepared by polymerizing vinyl chloride in aqueous dispersion. The polymer dispersion contained about 50% by weight of solid polymer particles having an average diameter of about 0.2 micron. The particles were maintained in a stable, latex-like dispersion in the water by means of a dispersing agent (2% by weight of the polymer) consisting of equal parts of the sodium salt of N-octadecyl-N-1,2-dicarboxyethyl sulfosuccinamide and of sodium alkylaryl sulfonate. A fourteen pound portion of this latex-like dispersion was coagulated by stirring into it an aqueous solution of calcium chloride (26 g. dissolved in 200 ml. of water). Coagulation was complete in about ten minutes. To the wet coagulum, at room temperature, there was added slowly and with continual stirring about 3½ pounds of di-2-ethylhexyl phthalate. After a few minutes stirring a dispersion of the polymer particles in the phthalate was formed, and the water formed a separable layer, which was readily decanted. Practically all of the water originally present was removed thus by decantation; the small amount remaining was in the form of small discrete droplets which could readily be removed by stirring or mechanically working the mass at reduced pressure, or by heating it for a short time at 50° C. (at which temperature the polymer is substantially insoluble in the di-2-ethylhexyl phthalate).

The dispersion of polymer particles in plasticizer thus obtained was readily converted into a water-free fully plasticized polymer composition by heating it at temperatures above 100° C., preferably at 150° to 250° C., to dissolve the polymer in the plasticizer. Upon cooling the plasticized polymer composition becomes a tough, rubber-like solid. If the small amount of dispersed water remaining in the composition has not previously been removed (as described in the preceding paragraph) it will be vaporized during this last heating step.

*Example II*

The same procedure was followed as in the preceding example, except that hydrochloric acid was employed to coagulate the original aqueous dispersion of polymer. The results were the same.

*Example III*

The same procedure was followed as in Example I, except that an aqueous solution of lead acetate (50 g. in 300 ml. of water) was employed to coagulate the aqueous dispersion of polymer particles.

*Example IV*

The same procedure was followed as in Example I except that a mixture of 2½ lb. of di-2-ethylhexyl phthalate with 1 lb. of n-hexane (in which the polymer is substantially insoluble at room temperature) was employed as the water-immiscible liquid. After separation of the water, the hexane could readily be vaporized from the dispersion.

Similar results may be obtained using other polymers and other water-immiscible liquids, as has been pointed out above.

It will be apparent that my process provides an economical and effective method for drying water-wet particles of polymer, and particularly for providing substantially water-free plasticized polymer compositions. Surprisingly enough, in spite of the fact that the water readily separates from the dispersion of polymer particles in water-immiscible liquid after the phase inversion had been carried out, the polymer particles do not separate thus but remain uniformly and stably dispersed in the liquid. No change has been noted in such dispersions even after storage for many months at room temperature. On the other hand, conversion of these dispersions (when the water-immiscible liquid is a plasticizer which dissolves the polymer at elevated temperatures) into fully plasticized compositions is readily accomplished by simple heating, without the necessity for mechanical working on a roll mill or in an internal mixer.

If desired, any of the usual pigments, fillers, reinforcing agents, stabilizers, and the like commonly employed with these thermoplastic polymer compositions may be mixed with the polymer particles before or after the dehydration is accomplished.

Although I have herein described specific embodiments of my invention I do not intend to limit myself solely thereto, but to include all of the obvious variations and modifications within the spirit and scope of the appended claims.

I claim:

1. In a method of preparing a water-free plasticized polymer of a monomeric material comprising predominantly a chloroethylene having from one to two chlorine atoms on one only of the carbon atoms, from a mixture of said polymer with water containing less than 80% by weight of water, the steps which comprise mixing said polymer-water mixture with a water-immiscible liquid plasticizer in which said polymer is substantially insoluble at temperatures up to 50° C. and in which said polymer is soluble at temperatures above 75° C., in proportions such that there is present from 0.2 to 4.0 parts by weight of said plasticizer to one part of said polymer and the polymer-water mixture is present dispersed in said plasticizer, inverting the phases to form a dispersion of polymer in said plasticizer and a separable aqueous phase, removing said aqueous phase from contact with the said polymer-plasticizer dispersion, heating said polymer-plasticizer dispersion at 50° C. to remove residual traces of moisture, and further heating the said water-free polymer-plasticizer dispersion at 150 to 250° C. to dissolve the polymer in said plasticizer and to form a homogeneous water-free, fully-plasticized polymer.

2. In a method of preparing a water-free plasticized polymer of a monomeric material comprising predominantly vinyl chloride, from a mixture of said polymer with water containing less than 80% by weight of water, the steps which comprise mixing said polymer-water mixture with a water-immiscible liquid plasticizer in which said polymer is substantially insoluble at temperatures up to 50° C. and in which said polymer is soluble at temperatures above 75° C., in proportions such that there is present from 0.2 to 4.0 parts of said plasticizer to one part of said polymer and the polymer-water mixture is present dispersed in said plasticizer, inverting the phases to form a dispersion of said polymer in said plasticizer and a separable aqueous phase, removing said aqueous phase from contact with the said polymer-plasticizer dispersion, heating said polymer-plasticizer dispersion at 50° C. to remove residual traces of moisture, and further heating the said water-free polymer-plasticizer dispersion at 150 to 250° C. to dissolve the said polymer in said plasticizer and to form a homogeneous, water-free, fully-plasticized polymer.

3. In a method of preparing a water-free plasticized polymer of vinyl chloride, from a mixture of said polymer with water containing less than 80% by weight of water, the steps which comprise mixing said polymer-water mixture with a water-immiscible liquid plasticizer in which said polymer is substantially insoluble at temperatures up to 50° C. and in which said polymer is soluble at temperatures above 75° C., in proportions such that there is present from 0.4 to 1.5 parts of said plasticizer to one part of said polymer and the polymer-water mixture is present dispersed in said plasticizer, inverting the phases to form a dispersion of said polymer in said plasticizer and a separable aqueous phase, removing said aqueous phase from contact with the said polymer-plasticizer dispersion, heating said polymer-plasticizer dispersion at 50° C. to remove residual traces of moisture, and further heating the said water-free polymer-plasticizer dispersion at 150 to 250° C. to dissolve the polymer in said plasticizer and to form a homogeneous, water-free, fully-plasticized polymer.

ARCHIE B. JAPS.

REFERENCES CITED

The following references are of record in the file of this patent:

UNITED STATES PATENTS

| Number | Name | Date |
|---|---|---|
| 609,936 | Ismay | Aug. 30, 1898 |
| 1,832,476 | Brocker | Nov. 17, 1931 |
| 2,373,347 | Schoenfeld | Apr. 10, 1945 |